United States Patent
Takeda et al.

(10) Patent No.: US 10,971,711 B2
(45) Date of Patent: Apr. 6, 2021

(54) SEPARATOR AND NON-AQUEOUS ELECTROLYTE SECONDARY BATTERY

(71) Applicant: TOYOTA JIDOSHA KABUSHIKI KAISHA, Toyota (JP)

(72) Inventors: Kazuhisa Takeda, Toyota (JP); Yuji Yokoyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 16/152,703

(22) Filed: Oct. 5, 2018

(65) Prior Publication Data
US 2019/0123320 A1  Apr. 25, 2019

(30) Foreign Application Priority Data
Oct. 25, 2017 (JP) .............................. JP2017-206516

(51) Int. Cl.
*H01M 2/16* (2006.01)
*H01M 10/0525* (2010.01)
*H01M 10/42* (2006.01)

(52) U.S. Cl.
CPC ......... *H01M 2/166* (2013.01); *H01M 2/1606* (2013.01); *H01M 2/1653* (2013.01); *H01M 10/0525* (2013.01); *H01M 10/4235* (2013.01)

(58) Field of Classification Search
CPC .......... H01M 2/14; H01M 2/16–1613; H01M 2/164–166; H01M 10/05; H01M 10/0525; H01M 10/4235
See application file for complete search history.

(56) References Cited

U.S. PATENT DOCUMENTS

| | | | | |
|---|---|---|---|---|
| 6,296,969 | B1 * | 10/2001 | Yano | H01M 2/1613 429/144 |
| 8,741,486 | B1 * | 6/2014 | Jacobsen | H01M 2/1613 429/236 |
| 2015/0236322 | A1 * | 8/2015 | Laramie | H01M 2/1686 429/145 |
| 2016/0141582 | A1 | 5/2016 | Fujisaki et al. | |
| 2018/0151884 | A1 * | 5/2018 | Yushin | H01M 10/0587 |

FOREIGN PATENT DOCUMENTS

| | | |
|---|---|---|
| JP | 2005-285605 A | 10/2005 |
| JP | 2016-012548 A | 1/2016 |
| WO | 2015098610 A1 | 7/2015 |

* cited by examiner

*Primary Examiner* — Christina Chern
(74) *Attorney, Agent, or Firm* — Sughrue Mion, PLLC

(57) ABSTRACT

The separator is used in a battery. The separator includes a porous film and a columnar filler. The porous film is made of resin. The columnar filler is made of insulating ceramic. The columnar filler is filled in the porous film. The axial direction of the columnar filler is in line with the thickness direction of the porous film.

19 Claims, 4 Drawing Sheets

SEPARATOR AND NON-AQUEOUS ELECTROLYTE SECONDARY BATTERY

This non-provisional application is based on Japanese Patent Application No. 2017-206516 filed on Oct. 25, 2017 with the Japan Patent Office, the entire contents of which are hereby incorporated by reference.

BACKGROUND

Field

The present disclosure relates to a separator and a non-aqueous electrolyte secondary battery.

Description of the Background Art

Japanese Patent Laying-Open No. 2016-012548 discloses a porous substrate impregnated in or coated with a dispersion liquid containing acicular boehmite.

SUMMARY

A separator is disposed between a positive electrode and a negative electrode. The positive electrode and the negative electrode are separated by the separator. The separator is a porous film. The pores in the separator are impregnated with an electrolyte solution. The electrolyte solution contains charge carriers (ions). Hereinafter, the positive electrode and the negative electrode may be collectively referred to as "the electrodes" where appropriate.

The electrodes may expand due to charging and discharging, for example. When the electrodes expand, the separator may be subjected to a pressing force from the electrodes. In addition, in order to prevent the battery case from being deformed due to the expansion of the electrodes or the like, the battery case may pressed from the outside, and accordingly, the separator may be subjected to a pressing force from the electrodes.

When the separator is pressed by a pressing force from the electrodes, in other words, a pressing force applied from the thickness direction of the separator, the pores in the separator may decrease. Due to the decrease of the pores, the mobility of the charge carriers may be inhibited, in other words, the electric resistance may increase.

An object of the present disclosure is to provide a separator that is resistant to a pressing force applied from the thickness direction thereof.

Hereinafter, the technical configuration and effects of the present disclosure will be described. However, the mechanism of action described in the present disclosure includes a presumption. Whether the mechanism of action is correct or not should not limit the scope of the claims.

[1] The separator of the present disclosure is used in a battery. The separator includes a porous film and a columnar filler. The porous film is made of resin. The columnar filler is made of insulating ceramic. The columnar filler is filled in the porous film. The axial direction of the columnar filler is in line with the thickness direction of the porous film.

In the separator of the present disclosure, since the columnar filler is in line with the thickness direction of the porous film, when the separator is subjected to a pressing force applied from the thickness direction thereof, the columnar filler may function as a supporter. Since the columnar filler functions as a supporter, it is possible to prevent the porous film from being crushed, in other words, it is possible to make the separator resistant to a pressing force applied from the thickness direction thereof. Since the separator is resistant to a pressing force applied from the thickness direction thereof, it is possible to prevent the electric resistance from increasing.

FIG. 1 is a conceptual diagram for explaining a columnar filler.

The axial direction of a columnar filler refers to a direction along which the columnar filler has a maximum diameter. An axial cross section refers to a cross section parallel to the axial direction in FIG. 1, the axial direction (a) is parallel to the z-axis direction. The axial cross section is parallel to the z axis direction.

The maximum diameter in the axial cross section is denoted as a first diameter (D1). The minimum diameter in the axial section is denoted as a second diameter (D2). In the present specification, the ratio of the first diameter (D1) to the second diameter (D2) may be denoted as a first aspect ratio (D1/D2) where appropriate. The columnar filler of the present disclosure has a first aspect ratio (D1/D2) of 2 or more.

The first diameter (D1) is equal in value to the maximum diameter of the columnar filler projected on the xz plane and the maximum diameter of the columnar filler projected on the yz plane. The second diameter (D2) is equal in value to the minimum diameter of the columnar filler projected on the yz plane and the minimum diameter of the columnar filler projected on the xy plane. Thus, the first diameter (D1) and the second diameter (D2) may be measured from a microscopic image of the columnar filler.

[2] An angle formed between the axial direction of the columnar filler and the surface of the porous film may be 75° or more to 90° or less.

In the present specification, the angle formed between the axial direction of the columnar filler and the surface of the porous film is denoted as an orientation angle (θ) where appropriate. When the angle formed between the axial direction of the columnar filler and the surface of the porous film is an acute angle or an obtuse angle (i.e., when the angle is not 90°), the acute angle is adopted as the angle formed between the axial direction of the columnar filler and the surface of the porous film. When the orientation angle (θ) approaches to 90°, it is considered that the columnar filler is oriented along the thickness direction of the porous film. When the orientation angle (θ) is 75° or more, it is possible to improve the resistance of the porous film against a pressing force applied from the thickness direction thereof.

[3] In the axial cross section of the columnar filler, the ratio of the maximum diameter of the columnar filler to the minimum diameter of the columnar filler may be 4 or more to 30 or less.

The ratio of the maximum diameter of the columnar filler in the axial cross section thereof to the minimum diameter of the columnar filler in the axial cross section thereof is the first aspect ratio (D1/D2) mentioned above.

When a tensile force is applied to the porous film in the in-plane direction, the columnar filler may serve as a cracking point of the porous film. The in-plane direction refers to the direction orthogonal to the thickness direction. The tensile force in the in-plane direction may occur, for example, in a nail penetration test or the like. When the first aspect ratio (D1/D2) is 4 or more, in other words, when the columnar filler has a predetermined thinness, the porous film may be prevented from cracking, which makes it possible to prevent a short circuit current from occurring in the nail penetration test, for example.

When the first aspect ratio (D1/D2) is 30 or less, in other words, the columnar filler has a predetermined thickness, it is expected to improve the resistance of the porous film against a pressing force applied from the thickness direction thereof. The considerable reason may be that the strength of the columnar filler in the axial direction (a) is improved.

[4] In a radial cross section of the columnar filler, the ratio of the maximum diameter of the columnar filler to the minimum diameter of the columnar filler may be 1 or more to 2 or less.

The radial cross section refers to such a cross section that is orthogonal to the axial direction. The radial cross section is parallel to the xy plane of FIG. 1. The minimum diameter in the radial cross section is denoted as a second diameter (D2). The maximum diameter in the radial cross section is denoted as a third diameter (D3). In the present specification, the ratio of the third diameter (D3) to the second diameter (D2) may be denoted as a second aspect ratio (D3/D2) where appropriate. The second aspect ratio (D3/D2) may have a value of 1 or more. If the second aspect ratio (D3/D2) is excessively large (in other words, the columnar filler is excessively flat), the porous film is likely to crack. When the second aspect ratio (D3/D2) is 2 or less, it is expected to prevent the porous film from cracking.

The third diameter (D3) is equal in value to the maximum diameter of the columnar filler projected on the xy plane. Thus, the third diameter (D3) may be measured from a microscopic image of the columnar filler.

[5] The separator may have a piercing stretch of 180% or more.

The piercing stretch in the present specification refers to a percentage of a permanent stretch after a needle has penetrated through a test piece with respect to the original dimension of the test piece in a piercing strength test carried out in accordance with "JIS Z 1707". The piercing stretch is measured at an environmental temperature of 23° C.±2° C., for example. The piercing stretch may be measured at least three times, and the arithmetic average of the at least three measurements may be adopted as the measurement result. The greater the piercing stretch is, the easier the separator may stretch.

When the separator has a piercing stretch is 180% or more, for example, it is expected to prevent a short circuit current from occurring in the nail penetration test. The considerable reason therefor may be that the separator stretches to follow the nail, which makes it possible to prevent a short circuit from occurring via the nail and/or a short circuit from occurring between the electrodes.

Generally, a separator having a high piercing stretch is likely to be crushed by a pressing force applied from the thickness direction. As described above, since the separator of the present disclosure is filled with the columnar fillers, it is expected that the separator is resistant to the pressing force applied from the thickness direction. Therefore, it is expected to prevent a short circuit current from occurring while preventing the electric resistance from increasing.

[6] The ratio of the maximum diameter of the columnar filler in the axial cross section thereof to the thickness of the porous film may be 0.8 or more to 1.2 or less.

When the ratio (D1/T) of the maximum diameter (D1) of the columnar filler in the axial cross section thereof to the thickness (T) of the porous film is 0.8 or more, it is expected to improve the resistance of the porous film against a pressing force applied from the thickness direction thereof. The considerable reason may be that a portion where no columnar filler is present in the thickness direction of the porous film is reduced. When the ratio (D1/T) is 1.2 or less, it is expected to prevent the electric resistance from increasing. The considerable reason may be that the distance between the electrodes is prevented from increasing due to the protrusion of the columnar filler from the porous film.

[7] In a cross section orthogonal to the thickness direction of the porous film, the ratio of the total cross-sectional area of the columnar fillers to the cross-sectional area of the separator may be 1% or more to 50% or less.

In the present specification, such ratio may be denoted as an occupied area ratio. When the occupied area ratio is 1% or more, it is expected to improve the resistance of the porous film against a pressing force applied from the thickness direction thereof. The considerable reason may be that the occupied area ratio of the column portion (columnar filler) is increased. When the occupied area ratio is 50% or less, it is expected to prevent the porous film from cracking. The considerable reason may be that the occurrence rate of cracking points is decreased.

[8] A through hole may be formed in the columnar filler. The through hole penetrates the columnar filler in the axial direction of the columnar filler, which makes it possible to reduce the electric resistance. The considerable reason may be that since the charge carriers can move inside the through holes, the movement of the charge carriers is promoted.

[9] The insulating ceramic may be ion conductive, which makes it possible to reduce the electric resistance. The considerable reason may be that since the charge carriers are conductible inside the columnar filler, the movement of charge carriers is promoted.

[10] The non-aqueous electrolyte secondary battery of the present disclosure includes at least the separator according to any one of the above [1] to [9], a positive electrode, a negative electrode, and an electrolyte solution. The separator is disposed between the positive electrode and the negative electrode.

Since the separator is resistant to a pressing force applied from the thickness direction thereof, the non-aqueous electrolyte secondary battery of the present disclosure is expected to have a low electric resistance.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment of the present disclosure (also referred to as "the present embodiment" in the present specification) will be described. It should be noted that the following description is not intended to limit the scope of claims.

<Separator>

The separator of the present embodiment is used in a battery. The separator may be used in, for example, a non-aqueous electrolyte secondary battery. The separator of the present embodiment may be used in a primary battery, an alkaline secondary battery or the like. As an example of the alkaline secondary battery, a nickel-hydrogen secondary battery may be given.

Figure 2:
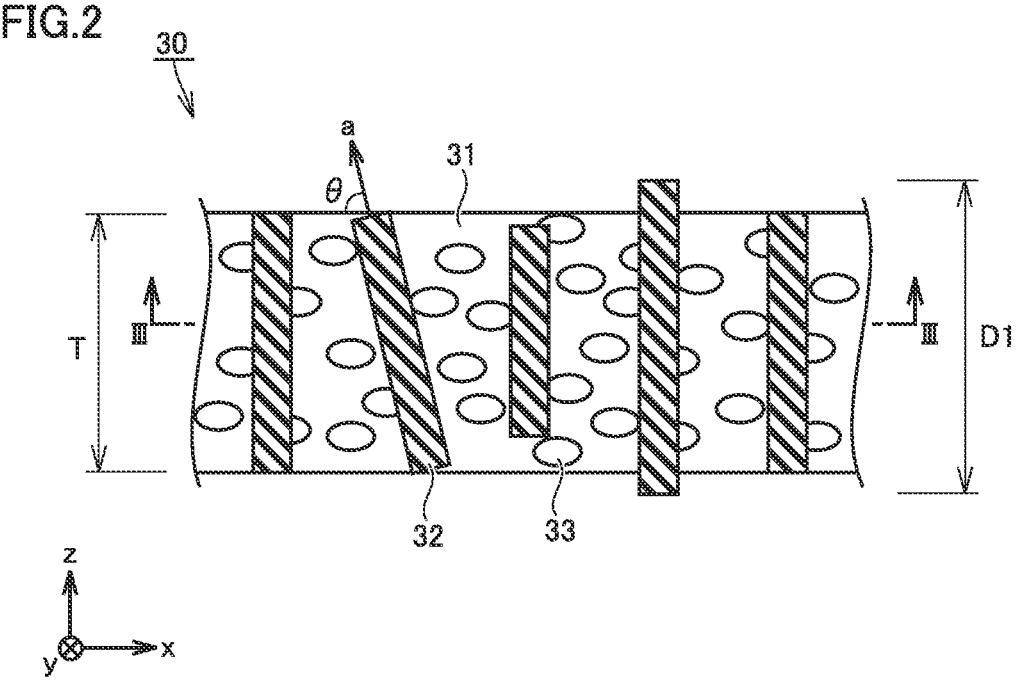
FIG. 2 is a first conceptual diagram illustrating a cross section of an example configuration of a separator according to an embodiment of the present disclosure.

FIG. 2 is a first conceptual diagram illustrating a cross section of an example configuration of a separator according to the present embodiment.

In the first conceptual diagram, a cross section in the thickness direction (or a cross section parallel to the thickness direction) of a separator 30 is illustrated. The separator 30 includes a porous film 31 and a columnar filler 32. The columnar filler 32 is filled in the porous film 31. The axial direction (a) of the columnar filler 32 is in line with the thickness direction (z-axis direction in FIG. 2) of the porous film 31.

(Piercing Stretch)

The piercing stretch of the separator 30 may be 50% or more, for example. The piercing stretch of the separator 30 may be 180% or more. When the piercing stretch of the separator 30 is 180% or more, it is expected to prevent a short circuit current from occurring in, for example, a nail penetration test. The considerable reason therefor may be that the separator stretches to follow the nail, which makes it possible to prevent a short circuit from occurring through the nail and/or a short circuit from occurring between the electrodes. The greater the piercing stretch is, the larger the effect of suppressing the short circuit current will be. The piercing stretch of the separator 30 may be, for example, 500% or more. The piercing stretch of the separator 30 may be, for example, 600% or less.

"Porous Film"

The porous film 31 is a base material of the separator 30. The porous film 31 is formed with a plurality of pores 33. The method of forming the pores 33 is not particularly limited. The pores 33 may be formed by, for example, a pore-forming method through stretching, a pore-forming method through phase separation, a pore-forming method through solvent swelling. The porous film may have a porosity of, for example, 5% or more to 95% or less. The porous film 31 may have a porosity of, for example, 30% or more to 70% or less. The porosity may be measured by, for example, a mercury intrusion porosimetry. The porosity may be measured at least three times, and the arithmetic average of the at least three measurements may be adopted as the measurement result.

The porous film 31 may have a thickness (T) of, for example, 5 μm or more to 50 μm or less. The porous film 31 may have a thickness (T) of, for example, 10 μm or more. The porous film 31 may have a thickness (T) of, for example, 40 μm or less. The porous film 31 may have a thickness (T) of, for example, 30 μm or less.

The thickness (T) of the porous film 31 may be measured by, for example, a micrometer. The thickness (T) of the porous film 31 may be measured from a microscope image or the like. The thickness (T) may be measured at least three points, and the arithmetic average of at least three measurements of the thickness (T) may be adopted as the measurement result. It is desirable that the interval between adjacent measuring points are equally spaced. It is desirable that the interval between the adjacent measuring points is 1 cm or more.

(Material)

The porous film 31 is made of resin. The resin is not particularly limited. The resin may be, for example, polyurethane (PU), polyethylene (PE), polyimide (PI), polyamide (PA), polypropylene (PP), polyethylene terephthalate (PET) or the like. The resin may be, for example, PU, PE or PI. PU is expected to have high piercing stretch. The piercing stretch of the separator 30 may be substantially the same as the piercing stretch of the porous film 31.

The material of the porous film 31 may be determined from, for example, a proton nuclear magnetic resonance ($^1$H-NMR) spectrum. The $^1$H-NMR spectrum may be measured by using, for example, a "NMR Spectrometer Z" manufactured by JEOL Ltd. or an equivalent one.

"Columnar Filler"

The columnar filler 32 is filled in the porous film 31. The axial direction (a) of the columnar filler 32 is in line with the thickness direction (z-axis direction in FIG. 2) of the porous film 31. When the separator 30 is subjected to a pressing force applied from the thickness direction thereof, the columnar filler 32 acts as a supporter, which makes it possible to prevent the porous film 31 from being crushed.

(Material)

The columnar filler 32 is made of insulating ceramic. The insulating ceramic may have, for example, a resistivity of $1 \times 10^9$ Ω·cm or more. The resistivity is determined at 20° C. The insulating ceramic may have a resistivity of, for example, $1 \times 10^{20}$ Ω·cm or less. If the columnar filler 32 is made of an electron conductive material, the positive electrode and the negative electrode may be short-circuited. As an example of the electron conductive material, a metal material, carbon or the like may be given.

The insulating ceramic may be, for example, alumina, boehmite, silica, titania, magnesia, zirconia or the like. These ceramics may have a resistivity of $1 \times 10^9$ Ω·cm or more. The resistivity of each material may be a literature value described in, for example, "Chemical Handbook" (edited by the Chemical Society of Japan and published by Maruzen Publishing) and the like. The insulating ceramic may be used alone in one kind or in combination of two or more kinds.

The insulating ceramic may be ion conductive. For example, when the separator is used in a lithium ion secondary battery, the insulating ceramic may have lithium ion conductivity, which makes it possible to reduce the electric resistance. The considerable reason may be that the movement of charge carriers (lithium ions in this example) is promoted. As an example of an ion-conductive insulating ceramic, lithium tungstate, lithium niobate, lithium titanate, lithium molybdate or the like may be given.

The material of the columnar filler 32 may be determined from, for example, an X-ray diffraction (XRD) pattern. The XRD pattern may be measured by using, for example, an XRD device "SmartLab" manufactured by Rigaku or an equivalent one. For example, CuKα rays may be used in the measurement. The range of 2θ may be, for example, 15° or more to 150° or less.

(Orientation Angle)

The columnar filler 32 is oriented in the thickness direction (z-axis direction in FIG. 2). In other words, the axial direction (a) of the columnar filler 32 is in line with the thickness direction (z-axis direction in FIG. 2) of the porous film 31. The orientation angle (θ) is an angle formed between the axial direction (a) of the columnar filler 32 and the surface of the porous film 31. The closer the orientation angle (θ) approaches to 90°, the more difficult the porous film 31 will be crushed. The orientation angle (θ) may be, for example, 70° or more to 90° or less.

The orientation angle (θ) may be 75° or more to 90° or less. When the orientation angle (θ) is 75° or more, the columnar filler 32 is more likely to function as a supporter, and thereby, it is expected to improve the resistance of the porous film against a pressing force applied from the thickness direction thereof.

The orientation angle (θ) may be measured from a microscopic image of the separator 30 obtained by using a scanning electron microscope (SEM). The orientation angle (θ) may be measured for at least 10 of the columnar fillers 32, and the arithmetic average of at least 10 orientation angles (θ) may be adopted as the measurement result.

As the SEM, for example, a tabletop microscope "Miniscope (registered trademark) TM4000 series" manufactured by Hitachi High-Technologies Corporation or an equivalent one may be used. The acceleration voltage may be, for example, 5 kV. The magnifying power may be appropriately modified according to the size of the sample. The magnifying power may be, for example, 300 times or more to 1000 times or less. The orientation angle (θ), the first aspect ratio (D1/D2) to be described later and the like may be calculated by performing an image analysis using a three-dimensional measurement software (for example, "Hitachi map 3D" or the like manufactured by Hitachi High-Technologies Corporation).

(Relationship to Thickness of Porous Film)

The ratio (D1/T) of the first diameter (D1) to the thickness (T) of the porous film may be, for example, 0.4 or more to 1.5 or less. The ratio (D1/T) may be 0.8 or more to 1.2 or less. When the ratio (D1/T) is 0.8 or more, it is expected to improve the resistance of the porous film against a pressing force applied from the thickness direction thereof. The considerable reason may be that a portion where no columnar filler 32 is present in the thickness direction of the porous film 31 is reduced. When the ratio (D1/T) is 1.2 or less, it is expected to prevent the electric resistance from increasing. The considerable reason may be that the distance between the electrodes is prevented from increasing due to the protrusion of the columnar filler 32 from the porous film 31.

The ratio (D1/T) may be, for example, 1 or more. In this range, it is expected to improve the resistance of the porous film against a pressing force applied from the thickness direction thereof. The ratio (D1/T) may be, for example, 1 or less. In this range, it is expected it is expected to prevent the electric resistance from increasing.

The thickness (T) of the porous film is measured in the same manner as that described above. The first diameter (D1) may be measured from an SEM image. The first diameter (D1) may be measured for at least 10 of the columnar fillers 32, and an arithmetic average of at least ten of the first diameters (D1) may be adopted as the measurement result.

(First Aspect Ratio)

Figure 1:
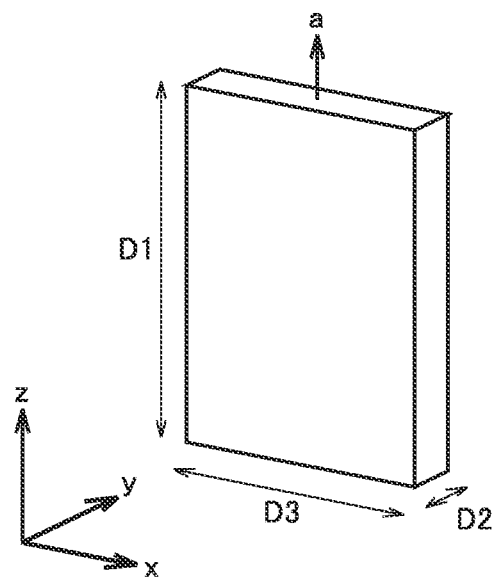
FIG. 1 is a conceptual diagram for explaining a columnar filler.

The first aspect ratio (D1/D2) of the columnar filler 32 is 2 or more. The first aspect ratio (D1/D2) is the ratio of the first diameter (D1) to the second diameter (D2) (FIG. 1). In other words, the first aspect ratio (D1/D2) is the ratio of the maximum diameter of the columnar filler 32 in the axial cross section thereof to the minimum diameter of the columnar filler 32 in the axial cross section thereof. The first aspect ratio (D1/D2) may be, for example, 2 or more to 40 or less.

The first aspect ratio (D1/D2) may be 4 or more to 30 or less. When the first aspect ratio (D1/D2) is 4 or more, it is expected to prevent a short circuit current from occurring in a nail penetration test, for example. The considerable reason may be that the porous film 31 is prevented from be cracked by a tensile force in the in-plane direction. When the first aspect ratio (D1/D2) is 30 or less, it is expected to improve the resistance of the porous film against a pressing force applied from the thickness direction thereof. The considerable reason may be that the strength of the columnar filler 32 in the axial direction (a) is improved.

The first aspect ratio (D1/D2) may be measured from an SEM image. The first aspect ratio (D1/D2) may be measured for at least 10 of the columnar fillers 32, and an arithmetic average of at least 10 of the first aspect ratios (D1/D2) may be adopted as the measurement result.

(Second Aspect Ratio)

The second aspect ratio (D3/D2) may be, for example, 1 or more to 3 or less. The second aspect ratio (D3/D2) is the ratio of the third diameter (D3) to the second diameter (D2) (FIG. 1). In other words, the second aspect ratio (D3/D2) is the ratio of the maximum diameter of the columnar filler 32 in the axial cross section thereof to the minimum diameter of the columnar filler 32 in the radial cross section thereof. The radial cross section refers to such a cross section that is orthogonal to the axial direction.

The second aspect ratio (D3/D2) may be 1 or more to 2 or less. When the second aspect ratio (D3/D2) is 2 or less, it is expected to prevent the porous film 31 from cracking. The considerable reason may be that the columnar filler 32 has a shape which is difficult for it to serve as a cracking point.

The second aspect ratio (D3/D2) may be measured from an SEM image. The second aspect ratio (D3/D2) may be measured for at least 10 of the columnar fillers 32, and an arithmetic average of at least ten of the second aspect ratios (D3/D2) may be adopted as the measurement result.

(Shape of Radial Cross Section)

Figure 3:
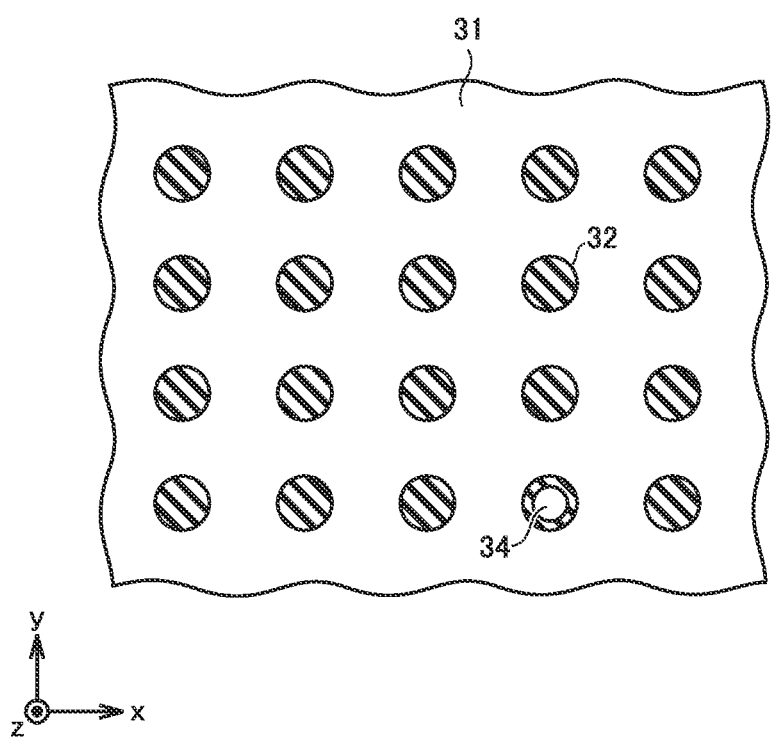
FIG. 3 is a second conceptual diagram illustrating a cross section of an example configuration of a separator according to an embodiment of the present disclosure.

FIG. 3 is a second conceptual diagram illustrating a cross section of an example configuration of a separator of the present embodiment.

In the second conceptual diagram, a cross section orthogonal to the thickness direction of the porous film 31 is illustrated. In FIG. 3, the pores 33 (FIG. 2) are not illustrated for convenience.

The columnar filler 32 in FIG. 3 has an orientation angle (θ) of 90°. Therefore, the shape of each columnar filler 32 in FIG. 3 is the shape of its radial cross section. The shape of the radial cross section of the columnar filler 32 is not particularly limited. The shape may be, for example, a square shape, a rectangular shape, a parallelogram shape, a diamond shape, a hexagonal shape, a circular shape or the like.

A through hole 34 may be formed in the columnar filler 32. The through hole 34 penetrates the columnar filler 32 in the axial direction (a) of the columnar filler 32. Since the through hole 34 is formed in the columnar filler 32, it is possible to reduce the electric resistance. The considerable reason may be that the movement of the charge carriers is promoted. The through hole 34 may formed by joining a plurality of pores to each other.

When the shape of the radial cross section of the columnar filler 32 is circular and the columnar filler 32 is formed with a through hole 34, the columnar filler 32 is regarded as having a cylindrical shape.

(Occupied Area Ratio)

The occupied area ratio may be, for example, 0.5% or more to 70% or less. The occupied area ratio is the ratio of the total cross-sectional area of the columnar fillers 32 to the cross-sectional area of the separator 30 in a cross section perpendicular to the thickness direction of the porous film 31. When the through hole 34 is formed in the columnar filler 32, the cross-sectional area of the through hole 34 is included in the cross-sectional area of the columnar filler 32.

The occupied area ratio may be 1% or more to 50% or less. When the occupied area ratio is 1% or more, it is expected to improve the resistance of the porous film against a pressing force applied from the thickness direction thereof. The considerable reason may be that the occupied area ratio of the column portion (columnar filler 32) is increased. When the occupied area ratio is 50% or less, it is expected to prevent the porous film 31 from cracking. The considerable reason may be that the occurrence rate of cracking points is decreased.

The occupied area ratio may be measured form an SEM image of the cross section orthogonal to the thickness direction of the porous film 31. The magnifying power may be appropriately adjusted according to the size of the columnar filler 32 or the like. The SEM image may be captured at least at five places. The SEM image may be captured in a rectangular range of, for example, 100 μm×100 μm. The arithmetic average of the occupied area ratios of the five SEM images may be adopted as the measurement result.

<Non-Aqueous Electrolyte Secondary Battery>

In the present specification, a lithium ion secondary battery will be described as an example of a non-aqueous electrolyte secondary battery. However, the non-aqueous electrolyte secondary battery of the present embodiment is not limited to a lithium ion secondary battery. The non-aqueous electrolyte secondary battery of the present embodiment may be, for example, a sodium ion secondary battery or the like. Hereinafter, the non-aqueous electrolyte secondary battery may be abbreviated as "the battery".

Figure 4:
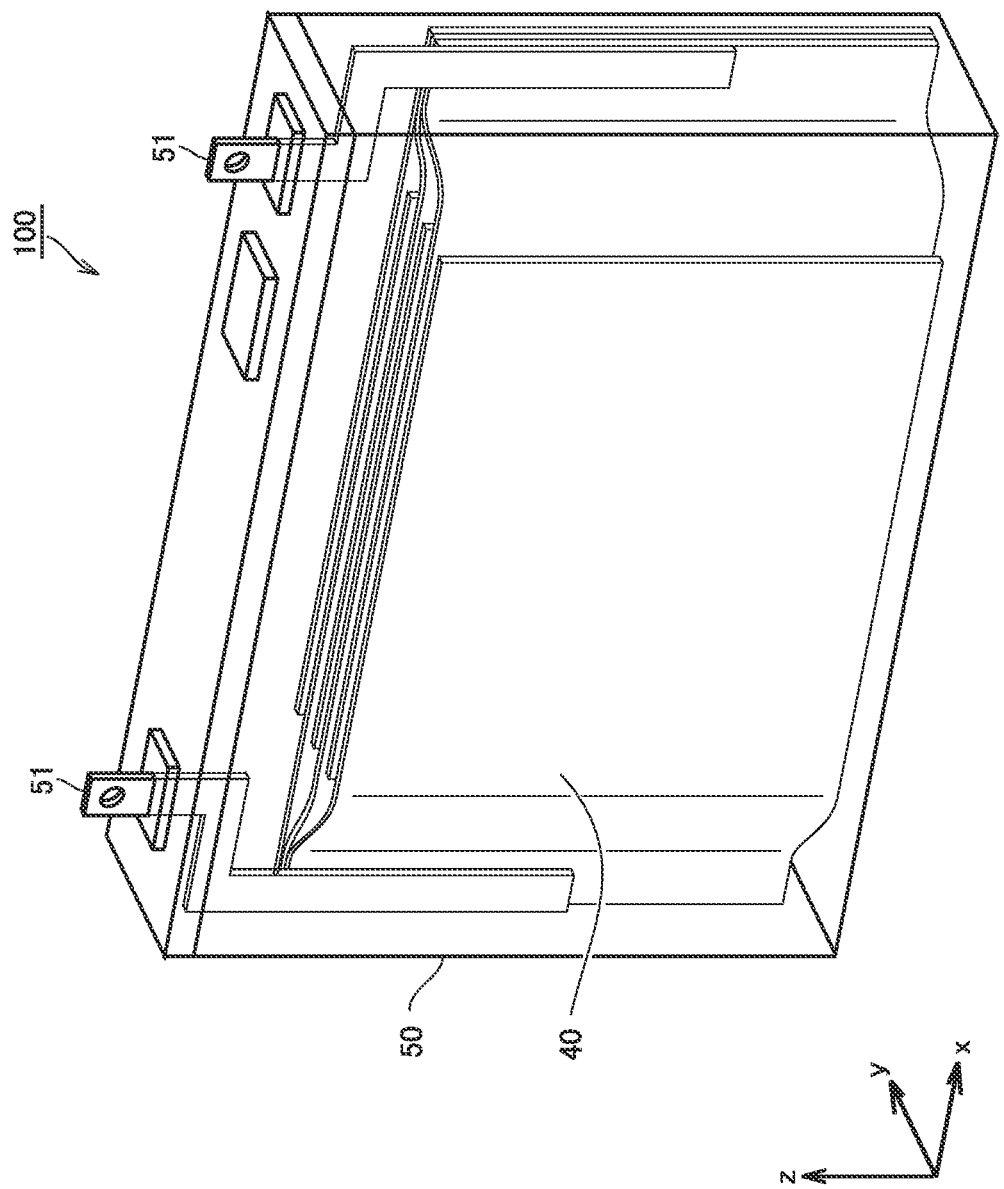
FIG. 4 is a schematic diagram illustrating an example configuration of a non-aqueous electrolyte secondary battery according to an embodiment of the present disclosure.
Figure 5:
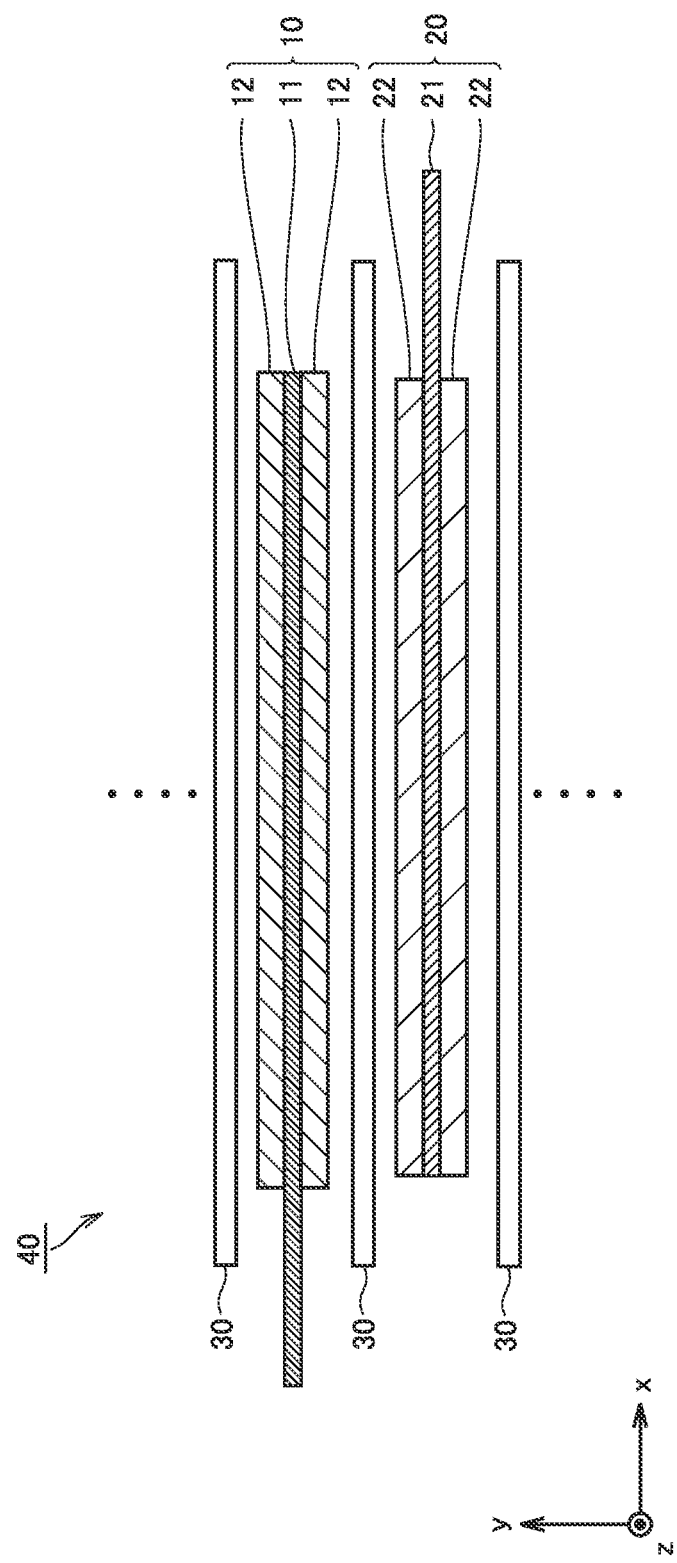
FIG. 5 is a conceptual diagram illustrating a cross section of an example configuration of an electrode group according to an embodiment of the present disclosure.

FIG. 4 is a schematic diagram illustrating an example configuration of a non-aqueous electrolyte secondary battery of the present embodiment.

The battery 100 includes a battery case 50. The battery case 50 is provided with a pair of external terminals 51. The battery case 50 may further be provided with a liquid injection port, a current interruption mechanism (CID), a gas discharge valve and the like. The battery case 50 is hermetically sealed. The battery case 50 houses the electrode group 40 and an electrolyte solution.

The battery case 50 may be made of, for example, an aluminum (Al) alloy or the like. The battery case 50 has a prismatic shape (flat rectangular parallelepiped shape). It should be noted that the case is not limited to the square prismatic shape. The battery case may be cylindrical, for example. The battery case may be in the form of a pouch made of, for example, Al laminated film or the like. In other words, the battery may be a laminate-type battery.

The battery case 50 may be compressed from both sides in the y-axis direction by using a restraint member (not shown). As described later, since the battery 100 includes the separator 30 of the present embodiment, even if the separator 30 is compressed by compressing the battery case 50 from both sides in the y-axis direction, it is expected to prevent the pores in the porous film 31 from decreasing, in other words, it is expected to prevent the electric resistance from increasing.

Fig. is a conceptual diagram illustrating a cross section of an example configuration of an electrode group of the present embodiment.

The electrode group 40 is a stacked type. The electrode group 40 is formed by alternately stacking the positive electrode 10 and the negative electrode 20 with the separator 30 sandwiched between the positive electrode 10 and the negative electrode 20.

In other words, the battery 100 includes at least the separator 30, the positive electrode 10, the negative electrode 20, and the electrolyte solution. The separator 30 is disposed between the positive electrode 10 and the negative electrode 20. The details of the separator 30 of the present embodiment are as described above.

Since the battery 100 includes the separator 30 of the present embodiment, it is expected that the battery 100 has a low electric resistance. In other words, since the separator 30 is resistant to a pressing force applied from the thickness direction thereof, it is considered that a lot of pores may exist in the separator 30, and thereby, the movement of lithium ions is promoted.

It should be noted that the electrode group may be winding type. The winding type electrode group may be formed, for example, by laminating a positive electrode, a separator and a negative electrode in order and winding the same spirally.

"Positive Electrode"

The positive electrode 10 is in the form of a sheet. The positive electrode 10 includes a positive electrode current collector 11 and a positive electrode composite material layer 12. The positive electrode current collector 11 is electrically connected to the external terminal 51. The positive electrode current collector 11 may be, for example, an Al foil or the like. The positive electrode current collector 11 may have a thickness of, for example, 5 μm or more to 50 μm or less. The positive electrode composite material layer 12 is formed on one surface of the positive electrode current collector 11. The positive electrode composite material layer 12 may be formed on both the front surface and the back surface of the positive electrode current collector 11. The positive electrode composite material layer 12 may have a thickness of, for example, 10 μm or more to 200 μm or less.

The positive electrode composite material layer 12 includes, for example, a positive electrode active material, a conductive material, and a binder. The positive electrode active material may have a d50 of, for example, 1 μm or more to 30 μm or less. The term of "d50" in the present specification represents a particle size of 50% accumulation from the finest particle in the volume-based particle size distribution. d50 is measured by laser diffraction scattering method.

The positive electrode active material is not particularly limited. For example, the positive electrode active material may be $LiCoO_2$, $LiNiO_2$, $LiMnO_2$, $LiMn_2O_4$, $Li(Ni, Co, Mn)O_2$ (such as $LiNi_{1/3}Co_{1/3}Mn_{1/3}O_2$), $Li(Ni, Co, Al)O_2$ (such as $LiNi_{0.8}Co_{0.15}Al_{0.05}O_2$), $LiFePO_4$ or the like. The positive electrode active material may be used alone in one kind or in combination of two kinds or more.

The conductive material is not particularly limited. The conductive material may be, for example, acetylene black (AB) or the like. The conductive material may be, for example, 1 part by mass or more to 20 parts by mass or less relative to 100 parts by mass of the positive electrode active material. The binder is also not particularly limited. The binder may be, for example, polyvinylidene difluoride (PVDF) or the like. The binder may be, for example, 1 part by mass or more to 5 parts by mass or less relative to 100 parts by mass of the positive electrode active material.

"Negative Electrode"

The negative electrode 20 is in the form of a sheet. The negative electrode 20 includes a negative electrode current collector 21 and a negative electrode composite material layer 22. The negative electrode current collector 21 is electrically connected to the external terminal 51. The negative electrode current collector 21 may be, for example, a copper (Cu) foil or the like. The negative electrode current collector 21 may have a thickness of, for example, 5 µm or more to 50 µm or less. The negative electrode composite material layer 22 is formed on one surface of the negative electrode current collector 21. The negative electrode composite material layer 22 may be formed on both the front surface and the back surface of the negative electrode current collector 21. The negative electrode composite material layer 22 may have a thickness of, for example, 10 µm or more to 200 µm or less.

The negative electrode composite material layer 22 includes, for example, a negative electrode active material and a binder. The negative electrode active material may have a d50 of, for example, 1 µm or more to 30 µm or less. The negative electrode active material is not particularly limited. For example, the negative electrode active material may be graphite, soft carbon, hard carbon, silicon, silicon-based alloy, silicon oxide, tin, tin-based alloy, tin oxide or the like. The negative electrode active material may be used alone in one kind or may be used in combination of two kinds or more.

The binder is not particularly limited. The binder may be, for example, carboxymethyl cellulose (CMC) and styrene butadiene rubber (SBR) or the like. The binder may be, for example, 0.5 parts by mass or more to 5 parts by mass or less relative to 100 parts by mass of the negative electrode active material.

"Electrolyte"

The electrolyte solution contains a solvent and a supporting electrolyte. The supporting electrolyte is dissolved in the solvent. The electrolyte solution may contain, for example, 0.5 mol/l or more to 2 mol/l or less of a supporting electrolyte. The supporting electrolyte may be, for example, $LiPF_6$, $LiBF_4$, $Li[N(FSO_2)_2]$, $Li[N(CF_3SO_2)_2]$ or the like. The supporting electrolyte may be used alone in one kind or in combination of two or more kinds.

The solvent may contain, for example, cyclic carbonate and chain carbonate. The mixing ratio of cyclic carbonate and chain carbonate may be, for example, cyclic carbonate/chain carbonate=1/9 to 5/5 in volume ratio. The cyclic carbonate may be, for example, ethylene carbonate (EC), propylene carbonate (PC), butylene carbonate (BC), fluoroethylene carbonate (FEC) or the like. The cyclic carbonate may be used alone in one kind or in combination of two or more kinds.

The chain carbonate may be, for example, dimethyl carbonate (DMC), ethyl methyl carbonate (EMC), diethyl carbonate (DEC) or the like. The chain carbonate may be used alone in one kind or in combination of two or more kinds.

The solvent may contain, for example, lactone, cyclic ether, chain ether, and carboxylic ester or the like. The lactone may be, for example, γ-butyrolactone (GBL), δ-valerolactone or the like. The cyclic ether may be, for example, tetrahydrofuran (THF), 1,3-dioxolane, 1,4-dioxane or the like. The chain ether may be, for example, 1,2-dimethoxyethane (DME) or the like. The carboxylic ester may be, for example, methyl formate (MF), methyl acetate (MA), methyl propionate (MP) or the like.

In addition to the solvent and the supporting electrolyte, the electrolyte solution may further contain various functional additives. The electrolyte solution may contain, for example, 1% by mass or more to 5% by mass or less of a functional additive. As examples of the functional additive, a gas generating agent (overcharge additive), a SEI (solid electrolyte interface) film forming agent or the like may be given. The gas generating agent may be, for example, cyclohexylbenzene (CHB), biphenyl (BP) or the like. The SEI film forming agent may be, for example, vinylene carbonate (VC), vinylethylene carbonate (VEC), $Li[B(C_2O_4)_2]$, $LiPO_2F_2$, propane sultone (PS), ethylene sulfite (ES) or the like. The functional additive may be used alone in one kind or in combination of two or more kinds.

EXAMPLES

Hereinafter, examples of the present disclosure will be described. It should be noted that the following description is not intended to limit the scope of claims.

<Production of Separator>

A separator according to each of Examples 1 to 23 and a separator according to each of Comparative Examples 1 to 6 were produced. The compositions of Examples and Comparative Examples are listed in the following Tables 1 to 3. In the following Tables 1 to 3, for example, "sample 1" represents "Example 1", and "sample 1*" represents "Comparative Example 1".

Example 1

A porous film 31 having the following composition was prepared.
material: polyurethane (PU)
thickness (T): 20 µm
porosity: 50%
piercing stretch: 600%
A columnar filler 32 having the following composition was prepared.
material: alumina
first diameter (D1): 20 µm
first aspect ratio (D1/D2): 15
second aspect ratio (D3/D2): 1.2
The columnar filler 32 was filled in the porous film 31 so that the axial direction (a) of the columnar filler 32 is in line with the thickness direction of the porous film 31. Thereby, the separator according to Example 1 was produced.

Example 2

A separator was produced in the same manner as in Example 1 except that the material of the columnar filler 32 was changed to lithium tungstate as listed in the following Table 1. In the following Table 1, lithium tungstate is abbreviated as "LWO".

Examples 3 and 4

A separator was produced in the same manner as in Example 1 except that the columnar filler 32 having the second aspect ratio (D3/D2) as listed in the following Table 1 was used.

Example 5

A separator was produced in the same manner as in Example 1 except that a cylindrical filler 32 was used. A through hole 34 is formed in the cylindrical filler 32. The through hole 34 penetrates the columnar filler 32 in the axial direction (a) of the columnar filler 32.

Examples 6 to 9

A separator was produced in the same manner as in Example 1 except that the columnar filler 32 having the first aspect ratio (D1/D2) as listed in the following Table 1 was used.

Examples 10 to 13

A separator was produced in the same manner as in Example 1 except that the columnar filler 32 having the first diameter (D1) as listed in the following Table 1 was used.

Examples 14 to 17

A separator was produced in the same manner as in Example 1 except that the columnar filler 32 was filled in the porous film 31 at an orientation angle (θ) as listed in the following Table 1.

Examples 18 to 21

A separator was produced in the same manner as in Example 1 except that the columnar filler 32 was filled in the porous film 31 at an occupied area ratio as listed in the following Table 1.

Comparative Example 1

The porous film 31 was used as a separator without any treatment.

Comparative Example 2

A spherical filler (d50: 1 μm, material: alumina) was prepared. The spherical filler was kneaded and mixed into polyurethane. Polyurethane containing the spherical filler was formed into a film. The film was subjected to a porosity forming process. Thereby, a separator according to Comparative Example 2 was produced.

Comparative Example 3

A paste was prepared by mixing the columnar filler 32, the binder and the solvent. The paste was applied to the surface of the porous film 31 and dried. Thereby, a coating layer was formed. The coating layer has a thickness of 5 μm. Thereby, a separator according to Comparative Example 3 was produced.

Comparative Example 4

A separator was produced in the same manner as in Example 1 except that the material of the columnar filler 32 was changed to carbon.

Example 22

A separator was produced in the same manner as in Example 1 except that a porous film 31 made of polyethylene (PE) was used. The composition of Example 22 is listed in the following Table 2.

Comparative Example 5

The porous film 31 used in Example 22 was used as a separator without any treatment.

Example 23

A separator was produced in the same manner as in Example 1 except that a porous film 31 made of polyimide (PI) was used. The composition of Example 23 is listed in the following Table 3.

Comparative Example 6

The porous film 31 used in Example 23 was used as the separator without any treatment.

<Evaluation>

"Production of Non-Aqueous Electrolyte Secondary Battery"

(Production of Positive Electrode)

The following materials were prepared.

positive electrode active material: Li(Ni, Co, Mn)O$_2$
conductive material: AB
binder: PVDF
solvent: N-methyl-2-pyrrolidone (NMP)
positive electrode current collector: Al foil (thickness=20 μm)

A paste was prepared by mixing the positive electrode active material, the conductive material, the binder and the solvent. The mixing ratio of the solid contents is "positive electrode active material/conductive material/binder=100/10/3 (mass ratio)". The paste was applied to the surface of the positive electrode current collector 11 and dried to form the positive electrode composite material layer 12. Thereby, the positive electrode 10 was manufactured. The positive electrode 10 was machined to a predetermined size. The size of the positive electrode 10 after machining is listed in the following:

thickness dimension of positive electrode 10: 70 μm
planar dimensions of positive electrode composite material layer 12: 30 mm (length)×30 mm (width)

(Production of Negative Electrode)

The following materials were prepared.

negative electrode active material: graphite (d50=20 μm)
binder: CMC and SBR
solvent: water
negative electrode current collector: Cu foil (thickness=10 μm)

A paste was prepared by mixing a negative electrode active material, a binder and a solvent. The mixing ratio of the solid contents is "negative electrode active material/binder=100/2 (mass ratio)". CMC and SBR are in equal amounts. The paste was applied on the surfaces of the negative electrode current collector 21 and dried to form the negative electrode composite material layer 22. Thereby, the negative electrode 20 was produced. The negative electrode 20 was machined to have a predetermined size. The size of the negative electrode 20 after machining is listed in the following:

thickness dimension of negative electrode 20: 80 μm
planar dimensions of negative electrode composite material layer 22: 32 mm (length)×32 mm (width)

(Assembling)

A collector lead was attached to each of the positive electrode 10 and the negative electrode 20. The positive electrode 10, the separator 30 (produced as in the above) and the negative electrode 20 were stacked to form the electrode group 40. A pouch made of Al laminate film was prepared as the battery case 50. The electrode group 40 was housed in the battery case 50.

An electrolyte solution having the following composition was prepared.

support electrolyte: LiPF$_6$ (1 mol/l)
solvent: [EC/DMC/EMC=1/1/1 (volume ratio)]

The electrolyte solution was injected into the battery case 50. The electrode group 40 was impregnated with the electrolyte solution. The battery case 50 was hermetically sealed. Thereby, the battery 100 (laminate-type lithium ion secondary battery) was produced.

"Discharge Test"

Two flat plates were prepared. The battery 100 was sandwiched between the two flat plates. A predetermined pressing force was applied to the battery 100 via the two flat plates. The battery 100 was charged to 3.7 V. The battery was discharged for 10 seconds at a current of 10 mA under an environmental temperature of 25° C., and a voltage drop amount was measured. The electric resistance was calculated by dividing the voltage drop amount by the current. The results are listed in the following Tables 1 to 3. It is considered that the lower the electric resistance is, the separator will be more resistant to a pressing force applied from the thickness direction thereof.

"Nail Penetration Test"

The battery 100 was charged to 4.1 V at a current of 10 mA. A nail was prepared. The nail has a body diameter of 3 mm. The nail was pierced into the battery 100 at a speed of 1 mm/sec. When the nail penetrated the battery 100, the voltage drop amount was measured. The results are listed in the following Tables 1 to 3. It is considered that the smaller the voltage drop amount is, the more the short circuit current will be suppressed

TABLE 1

List of Samples (1)

| | Separator | | | | | | | | | | | Evaluation | |
|---|---|---|---|---|---|---|---|---|---|---|---|---|---|
| | Porous Film | | | Filler | | | | | | | | | Nail Penetration Test |
| | | | | | | First Aspect | Second Aspect | | | Orientation | Occupied | Discharge | Voltage |
| | | Thickness | Piercing | | | First Diameter | Ratio | Ratio | Filing | Ratio | Angle | Area | Test | Drop |
| Sample | Material | (T) [μm] | Stretch [%] | Material | Shape | (D1) [μm] | (D1/D2) | (D3/D2) | Position | (D1/T) | (θ) [°] | Ratio [%] | Resistance [mΩ] | Amount [V] |
|---|---|---|---|---|---|---|---|---|---|---|---|---|---|---|
| 1* | PU | 20 | 600 | — | — | — | — | — | — | — | — | 0 | 564 | 0 |
| 2* | PU | 20 | 600 | alumina | spherical | 1 | 1 | 1 | inside the film | 0.05 | — | 20 | 540 | 0 |
| 3* | PU | 20 | 600 | alumina | columnar | 20 | 15 | 1.2 | on the surface | 1 | — | 0 | 603 | 0 |
| 4* | PU | 20 | 600 | carbon | columnar | 20 | 15 | 1.2 | inside the film | 1 | 90 | 20 | — | — |
| 1 | PU | 20 | 600 | alumina | columnar | 20 | 15 | 1.2 | inside the film | 1 | 90 | 20 | 152 | 0 |
| 2 | PU | 20 | 600 | LWO | columnar | 20 | 15 | 1.2 | inside the film | 1 | 90 | 20 | 98 | 0 |
| 3 | PU | 20 | 600 | alumina | columnar | 20 | 15 | 2 | inside the film | 1 | 90 | 20 | 152 | 0 |
| 4 | PU | 20 | 600 | alumina | columnar | 20 | 15 | 3 | inside the film | 1 | 90 | 20 | 164 | 1.2 |
| 5 | PU | 20 | 600 | alumina | cylindrical | 20 | 15 | 1 | inside the film | 1 | 90 | 20 | 93 | 0 |
| 6 | PU | 20 | 600 | alumina | columnar | 20 | 4 | 1.2 | inside the film | 1 | 90 | 20 | 170 | 0 |
| 7 | PU | 20 | 600 | alumina | columnar | 20 | 30 | 1.2 | inside the film | 1 | 90 | 20 | 150 | 0 |
| 8 | PU | 20 | 600 | alumina | columnar | 20 | 2 | 1.2 | inside the film | 1 | 90 | 20 | 178 | 1.1 |
| 9 | PU | 20 | 600 | alumina | columnar | 20 | 40 | 1.2 | inside the film | 1 | 90 | 20 | 490 | 0 |
| 10 | PU | 20 | 600 | alumina | columnar | 24 | 15 | 1.2 | inside the film | 1.2 | 90 | 20 | 158 | 0 |
| 11 | PU | 20 | 600 | alumina | columnar | 16 | 15 | 1.2 | inside the film | 0.8 | 90 | 20 | 167 | 0 |
| 12 | PU | 20 | 600 | alumina | columnar | 30 | 15 | 1.2 | inside the film | 1.5 | 90 | 20 | 254 | 0 |
| 13 | PU | 20 | 600 | alumina | columnar | 8 | 15 | 1.2 | inside the film | 0.4 | 90 | 20 | 399 | 0 |
| 14 | PU | 20 | 600 | alumina | columnar | 20 | 15 | 1.2 | inside the film | 1 | 75 | 20 | 170 | 0 |
| 15 | PU | 20 | 600 | alumina | columnar | 20 | 15 | 1.2 | inside the film | 1 | 70 | 20 | 370 | 0 |
| 16 | PU | 20 | 600 | alumina | columnar | 20 | 15 | 1.2 | inside the film | 1 | 75 | 20 | 167 | 0 |
| 17 | PU | 20 | 600 | alumina | columnar | 20 | 15 | 1.2 | inside the film | 1 | 70 | 20 | 386 | 0 |
| 18 | PU | 20 | 600 | alumina | columnar | 20 | 15 | 1.2 | inside the film | 1 | 90 | 1 | 168 | 0 |
| 19 | PU | 20 | 600 | alumina | columnar | 20 | 15 | 1.2 | inside the film | 1 | 90 | 50 | 180 | 0 |

TABLE 1-continued

List of Samples (1)

| | Separator | | | | | | | | | | | | Evaluation | |
|---|---|---|---|---|---|---|---|---|---|---|---|---|---|---|
| | Porous Film | | | Filler | | | | | | | | | Discharge Test | Nail Penetration Test |
| | | | | | | First | Second | | | Orien- | | | | |
| Sample | Material | Thickness (T) [μm] | Piercing Stretch [%] | Material | Shape | First Diameter (D1) [μm] | Aspect Ratio (D1/D2) | Aspect Ratio (D3/D2) | Filing Position | Ratio (D1/T) | tation Angle (θ) [°] | Occupied Area Ratio [%] | Resistance [mΩ] | Voltage Drop Amount [V] |
| 20 | PU | 20 | 600 | alumina | columnar | 20 | 15 | 1.2 | inside the film | 1 | 90 | 0.5 | 404 | 0 |
| 21 | PU | 20 | 600 | alumina | columnar | 20 | 15 | 1.2 | inside the film | 1 | 90 | 70 | 190 | 0.8 |

TABLE 2

List of Samples (2)

| | Separator | | | | | | | | | | | | Evaluation | |
|---|---|---|---|---|---|---|---|---|---|---|---|---|---|---|
| | Porous Film | | | Filler | | | | | | | | | Discharge Test | Nail Penetration Test |
| | | | | | | First | Second | | | Orien- | | | Normal | |
| Sample | Material | Thickness (T) [μm] | Piercing Stretch [%] | Material | Shape | First Diameter (D1) [μm] | Aspect Ratio (D1/D2) | Aspect Ratio (D3/D2) | Filing Position | Ratio (D1/T) | tation Angle (θ) [°] | Occupied Area Ratio [%] | Temperature Resistance [mΩ] | Voltage Drop Amount [V] |
| 5* | PE | 20 | 180 | — | — | — | — | — | — | — | — | 0 | 201 | 1.5 |
| 22* | PE | 20 | 180 | alumina | columnar | 20 | 15 | 1.2 | inside the film | 1 | 90 | 20 | 149 | 1.5 |

TABLE 3

List of Samples (3)

| | Separator | | | | | | | | | | | | Evaluation | |
|---|---|---|---|---|---|---|---|---|---|---|---|---|---|---|
| | Porous Film | | | Filler | | | | | | | | | Discharge Test | Nail Penetration Test |
| | | | | | | First | Second | | | Orien- | | | Normal | |
| Sample | Material | Thickness (T) [μm] | Piercing Stretch [%] | Material | Shape | First Diameter (D1) [μm] | Aspect Ratio (D1/D2) | Aspect Ratio (D3/D2) | Filing Position | Ratio (D1/T) | tation Angle (θ) [°] | Occupied Area Ratio [%] | Temperature Resistance [mΩ] | Voltage Drop Amount [V] |
| 6* | PI | 20 | 50 | — | — | — | — | — | — | — | — | 0 | 174 | 2.1 |
| 23* | PI | 20 | 50 | alumina | columnar | 20 | 15 | 1.2 | inside the film | 1 | 90 | 20 | 151 | 2.1 |

Results

Example 1 and Comparative Examples 1 to 4

Comparative example 1 has a higher electric resistance. The considerable reason may be that since polyurethane (PU) has a higher piercing stretch (easy to deform), when a pressing force is applied from the thickness direction, the porous film 31 is crushed, making the pores to decrease.

The electric resistance of Example 1 is lower than that of Comparative Example 1. The considerable reason may be that the columnar filler 32 may function as a supporter, preventing the porous film 31 from being crushed.

Comparative Example 2 has a higher electric resistance. The considerable reason may be that since the filler is spherical, it can not function as a supporter.

Comparative Example 3 has a higher electric resistance. The considerable reason may be that when the columnar filler 32 is coated on the surface of the porous film 31, the columnar filler 32 can not function as a supporter.

In Comparative Example 4, the positive electrode 10 and the negative electrode 20 were short-circuited and could not be charged. The considerable reason may be that the columnar filler 32 is conductive.

Example 2

In Example 2, the reduction of the electric resistance is greater. The considerable reason may be that the columnar filler 32 is ion conductive.

Examples 3 and 4

It can be seen that when the second aspect ratio (D3/D2) is 1 or more to 2 or less, a short circuit current is likely to be prevented from occurring in the nail penetration test. The considerable reason may be that the columnar filler 32 has a shape which is difficult for it to serve a cracking point of the porous film 31.

Example 5

In Example 5, the reduction of the electric resistance is greater. The considerable reason may be that the columnar filler 32 is provided with the through hole 34.

Examples 6 to 9

It can be seen that when the first aspect ratio (D1/D2) is 4 or more, a short circuit current is likely to be prevented from occurring in the nail penetration test. The considerable reason may be that the porous film 31 is difficult to crack since the columnar filler 32 has a smaller thinness.

It can be seen that when the first aspect ratio (D1/D2) is 30 or less, the reduction of the electric resistance is likely to become greater. The considerable reason may be that the strength of the columnar filler 32 in the axial direction (a) is improved when the columnar filler 32 is thick

Examples 1, 10 to 13

It can be seen that when the ratio (D1/T) of the first diameter (D1) to the thickness (T) of the porous film 31 is 0.8 or more, the reduction of the electric resistance is likely to become greater. The considerable reason may be that a portion where no columnar filler 32 is present in the thickness direction of the porous film 31 is reduced.

It can be seen that when the ratio (D1/T) is 1.2 or less, the reduction of the electric resistance is likely to become greater. The considerable reason may be that the distance between the electrodes is decreased.

Examples 1, 14 to 17

It can be seen that when the orientation angle (θ) is 75° or more to 90° or less, the reduction of the electric resistance is likely to become greater. The considerable reason may be that the closer the orientation angle (θ) approaches to 90°, the more likely the columnar filler 32 will function as a supporter.

Examples 18 to 21

It can be seen that when the occupied area ratio is 1% or more, the reduction of the electric resistance is likely to become greater. The considerable reason may be that the occupied area ratio of the column portion (columnar filler 32) is high.

It can be seen that when the occupied area ratio is 50% or less, the short circuit current is likely to be prevented from occurring in the nail penetration test. The considerable reason may be that the occurrence rate of cracking points is decreased.

Example 22 and Comparative Example 5

It can be seen that even when the material of the porous film 31 is polyethylene (PE), the electric resistance is reduced. However, since PE has a low piercing stretch (which makes it hard to deform), the reduction of the electric resistance is small.

Example 23 and Comparative Example 6

It can be seen that even when the material of the porous film 31 is polyimide (PI), the electric resistance is reduced. However, since PI has a low piercing stretch, the reduction of the electric resistance is small.

Examples 1, 22 and 23

It can be seen that when the piercing stretch is 180% or more, a short circuit current is likely to be prevented from occurring in the nail penetration test. The considerable reason may be that the separator 30 (the porous film 31) stretches to follow the nail.

The embodiments and examples disclosed herein are illustrative and non-restrictive in any respect. The technical scope indicated by the claims is intended to include any modifications within the scope and meaning equivalent to the terms of the claims.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A separator for a battery, comprising:
a porous film and a columnar filler, wherein
the porous film is made of resin,
the columnar filler is made of insulating ceramic,
the columnar filler is filled in the porous film,
an axial direction of the columnar filler is in line with a thickness direction of the porous film, the separator has a piercing stretch of 180% or more, and in a radial cross section of the columnar filler, a ratio of a maximum radial diameter of the columnar filler to a minimum radial diameter of the columnar filler is 1 or more to 2 or less.

2. The separator according to claim 1, wherein
an angle formed between the axial direction of the columnar filler and a surface of the porous film is 75° or more to 90° or less.

3. The separator according to claim 1, wherein
in an axial cross section of the columnar filler, a ratio of a maximum diameter of the columnar filler to a minimum diameter of the columnar filler is 4 or more to 30 or less.

4. The separator according to claim 1, wherein
a ratio of the maximum diameter of the columnar filler in the axial cross section of the columnar filler to the thickness of the porous film is 0.8 or more to 1.2 or less.

5. The separator according to claim 1, wherein
in a cross section orthogonal to the thickness direction of the porous film, a ratio of the total cross-sectional area of the columnar fillers to the cross-sectional area of the separator is 1% or more to 50% or less.

6. The separator according to claim 1, wherein
a through hole is formed in the columnar filler,
the through hole penetrates the columnar filler in the axial direction of the columnar filler.

7. The separator according to claim 1, wherein
the insulating ceramic is ion conductive.

8. A non-aqueous electrolyte secondary battery comprising:
at least the separator according to claim 1;
a positive electrode;
a negative electrode; and
an electrolytic solution,
the separator being disposed between the positive electrode and the negative electrode.

9. A separator for a battery, comprising:
a porous film and a columnar filler, wherein
the porous film is made of resin,
the columnar filler is made of insulating ceramic,
the columnar filler is filled in the porous film,
an axial direction of the columnar filler is in line with a thickness direction of the porous film,
a ratio of a maximum diameter of the columnar filler in an axial cross section of the columnar filler to the thickness of the porous film is 0.8 or more to 1.2 or less,
a through hole is formed in the columnar filler,
the through hole penetrates the columnar filler in the axial direction of the columnar filler, and
the separator has a piercing stretch of 180% or more.

10. The separator according to claim 9, wherein
an angle formed between the axial direction of the columnar filler and a surface of the porous film is 75° or more to 90° or less.

11. The separator according to claim 9, wherein
in the axial cross section of the columnar filler, a ratio of the maximum diameter of the columnar filler to a minimum diameter of the columnar filler is 4 or more to 30 or less.

12. The separator according to claim 9, wherein
in a radial cross section of the columnar filler, a ratio of a maximum radial diameter of the columnar filler to a minimum radial diameter of the columnar filler is 1 or more to 2 or less.

13. The separator according to claim 9, wherein
in a cross section orthogonal to the thickness direction of the porous film, a ratio of the total cross-sectional area of the columnar fillers to a cross-sectional area of the separator is 1% or more to 50% or less.

14. The separator according to claim 9, wherein
the insulating ceramic is ion conductive.

15. A non-aqueous electrolyte secondary battery comprising:
at least the separator according to claim 9;
a positive electrode;
a negative electrode; and
an electrolytic solution,
the separator being disposed between the positive electrode and the negative electrode.

16. A separator for a battery, comprising:
a porous film and a columnar filler, wherein
the porous film is made of resin,
the columnar filler is made of insulating ceramic,
the columnar filler is filled in the porous film,
an axial direction of the columnar filler is in line with a thickness direction of the porous film,
the separator has a piercing stretch of 180% or more
in a cross section orthogonal to the thickness direction of the porous film, a ratio of the total cross-sectional area of the columnar fillers to the cross-sectional area of the separator is 1% or more to 50% or less.

17. The separator according to claim 16, wherein
an angle formed between the axial direction of the columnar filler and a surface of the porous film is 75° or more to 90° or less.

18. The separator according to claim 16, wherein
in a radial cross section of the columnar filler, a ratio of a maximum radial diameter of the columnar filler to a minimum radial diameter of the columnar filler is 1 or more to 2 or less.

19. The separator according to claim 16, wherein
a ratio of a maximum diameter of the columnar filler in the axial cross section of the columnar filler to the thickness of the porous film is 0.8 or more to 1.2 or less.

* * * * *